(12) United States Patent
Kato

(10) Patent No.: US 9,254,452 B2
(45) Date of Patent: Feb. 9, 2016

(54) CRYSTALLIZATION DEVICE

(75) Inventor: Yoshikazu Kato, Toda (JP)

(73) Assignees: SATAKE CHEMICAL EQUIPMENT MFG LTD., Moriguchi-shi (JP); HADO CO., LTD., Incheon (KR)

( * ) Notice: Subject to any disclaimer, the term of this patent is extended or adjusted under 35 U.S.C. 154(b) by 0 days.

(21) Appl. No.: 14/415,925

(22) PCT Filed: Jul. 17, 2012

(86) PCT No.: PCT/JP2012/068077
§ 371 (c)(1),
(2), (4) Date: Feb. 19, 2015

(87) PCT Pub. No.: WO2014/013540
PCT Pub. Date: Jan. 23, 2014

(65) Prior Publication Data
US 2015/0182873 A1   Jul. 2, 2015

(51) Int. Cl.
*B01D 9/00*   (2006.01)
(52) U.S. Cl.
CPC ............... *B01D 9/0018* (2013.01); *B01D 9/00* (2013.01); *B01D 2009/0086* (2013.01)
(58) Field of Classification Search
CPC .......................................................... B01D 9/00
USPC .................................................... 422/245.1
See application file for complete search history.

(56) References Cited

U.S. PATENT DOCUMENTS

| 1,997,277 | A | * | 4/1935 | Burke et al. | ................... | 422/252 |
| 3,071,447 | A | * | 1/1963 | Bernhardi | ..................... | 422/252 |
| 4,798,131 | A | * | 1/1989 | Ohta et al. | .................... | 99/277.2 |
| 6,334,878 | B1 | | 1/2002 | Miyahara et al. | | |

FOREIGN PATENT DOCUMENTS

| JP | H0760093 A | 3/1995 |
| JP | 2003340201 A | 12/2003 |
| JP | 2012223727 A | 11/2012 |
| WO | 9837938 A1 | 9/1998 |

OTHER PUBLICATIONS

Jan. 22, 2013 International Search Report issued in International Applcation No. PCT/JP2012/068077.

* cited by examiner

*Primary Examiner* — Sean E Conley
(74) *Attorney, Agent, or Firm* — Oliff PLC

(57) ABSTRACT

To provide a crystallization device with a simple structure and high classification performance in crystallization at a center part of an upper part in a vertical container having a classification leg on a bottom portion, rotor blade unit for generating a swirling flow of a raw material liquid of a suspension slurry in the container along an inner circumferential surface of the container is provided, and at a center part on a bottom surface of the container, liquid-flow direction changing unit for causing the raw material liquid to flow upward at the center part of the container is provided, and the liquid-flow direction changing unit is formed of baffles, each being made of a band-shaped plate, provided radially on the bottom surface.

8 Claims, 5 Drawing Sheets

CRYSTALLIZATION DEVICE

TECHNICAL FIELD

The present invention relates to a crystallization device applied to obtainment of intermediate products and end products in the fields of pharmaceutical products, food products and the like.

BACKGROUND ART

As a prior-art crystallization device, such a device is known in which a draft tube b is provided at a center part in a sealed vertical container a, a stirring blade c is pivotally supported on a lower part in the draft tube b, a baffle e is suspended in a swollen portion d in a lower half part of the vertical container a with an inside in the swollen portion d outside the baffle e being formed as a set ring region f, a classification leg g is provided on a lower part of the vertical container a, a crystal outflow tube h is connected to the classification leg g, a circulation pipeline i is connected between a lower end part of the classification leg g and the swollen portion d with a pump j interposed in the circulation pipeline i, the stirring blade c is rotated so as to circulate a suspension slurry inside and out of the draft tube b, the crystal having grown to a desired size during this circulation goes out of a circulation flow and settles on a bottom part in the vertical container a, the crystal classified in the classification leg g flows out of the outflow tube h, and a part of a solution containing microcrystals in the set ring region f flows to the classification leg g via the circulation pipeline i, while another part thereof is heated, whereby the microcrystals are dissolved, and is returned into the container a (see Non-Patent Literature 1).

CITATION LIST

Non-Patent Literature

Non-Patent Literature 1: "Chemical Engineering References" edited by Chemical Industry Association, published by Maruzen Publishing Co., Ltd., Mar. 18, 1988, p. 444 to 445

SUMMARY OF INVENTION

Technical Problem

According to this prior-art crystallization device, it is configured such that the draft tube b is provided in the container a, the lower half part of the container a is formed as the swollen portion d and the baffle e is suspended therein, and the set ring region f is formed between the swollen portion d and the baffle e, and thus, it has a problem that the structure is complicated and the device is expensive.

The present invention has an object to solve such a problem and to provide a crystallization device having high classification performance in crystallization with a simple structure.

Solution to Problem

In order to achieve the object, the present invention is characterized in that rotor blade means for generating a swirling flow of a raw material liquid in the container along an inner circumferential surface of the container is provided at a center part of an upper part in a vertical container having a classification leg on a bottom part, and liquid-flow direction changing means for causing the raw material liquid to flow upward at the center part of the container is provided at a center part of a bottom surface in the vertical container.

Advantageous Effect of Invention

According to the present invention, an effect of high classification performance in crystallization with a simple structure is provided.

DESCRIPTION OF EMBODIMENT

Figure 1:
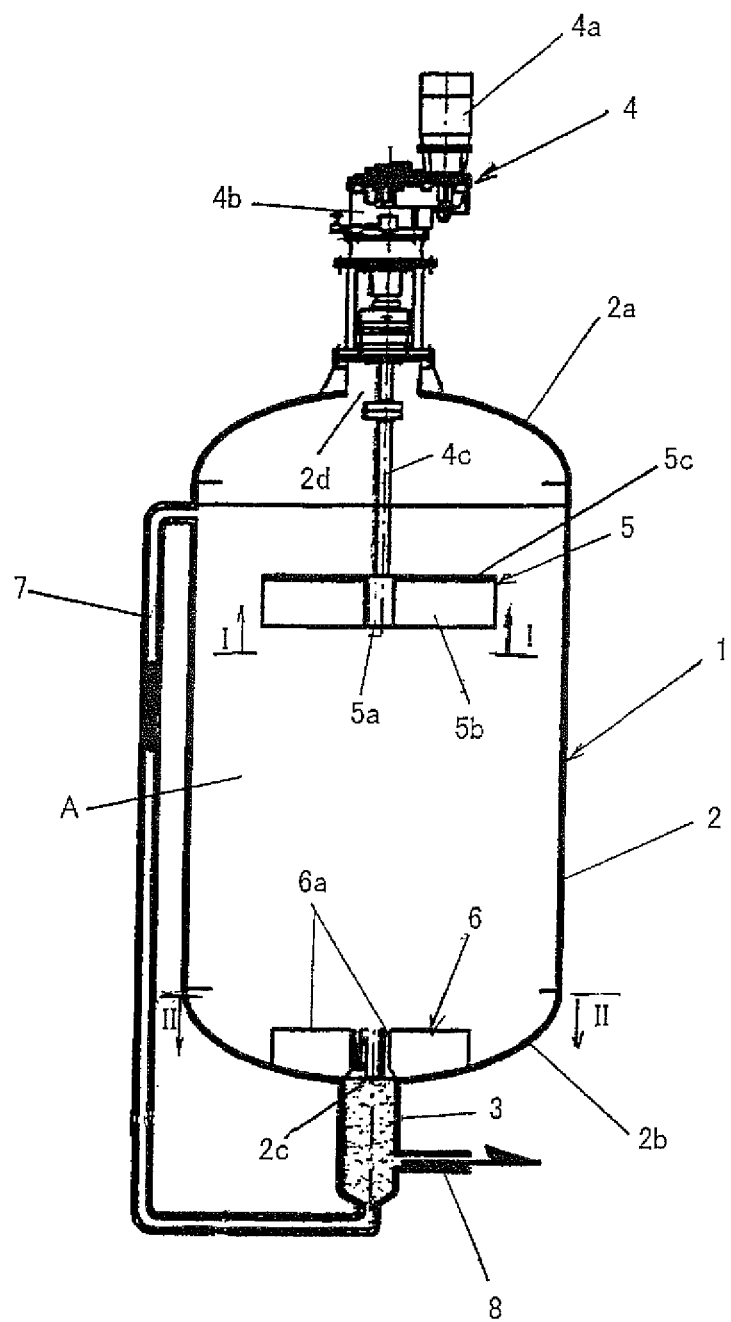
FIG. 1 is a front sectional view of a crystallization device of an embodiment 1 of the present invention.
Figure 3:
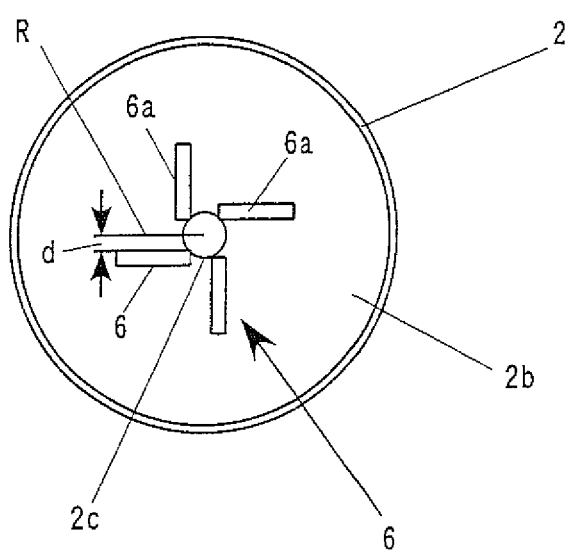
FIG. 3 is a sectional view cut on II-II line in FIG. 1.
Figure 4:
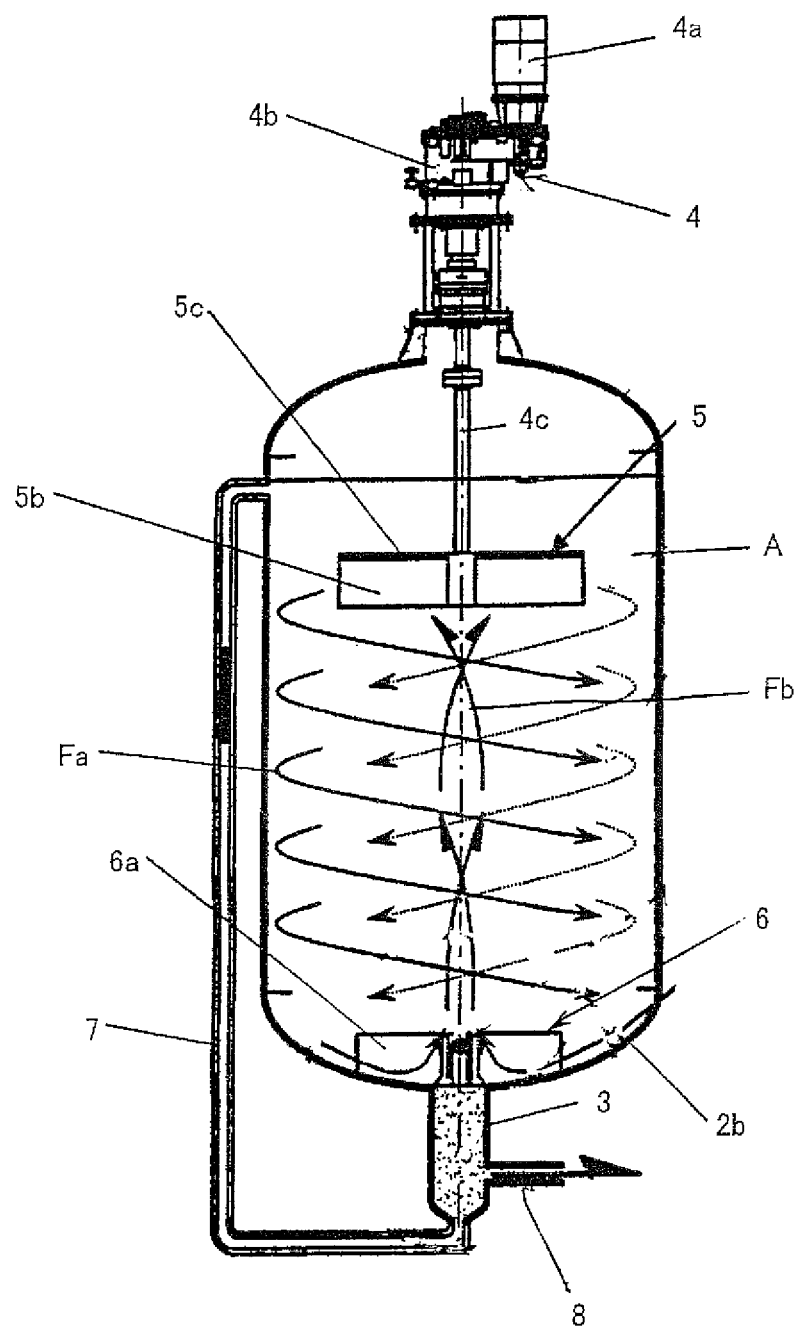
FIG. 4 is a front sectional view illustrating a flow pattern in a container of the crystallization device in the embodiment 1.

An embodiment for carrying out the present invention will be described below.
Embodiment 1
An embodiment 1 of the present invention will be described by referring to FIGS. 1 to 4.
FIG. 1 is a front sectional view of a crystallization device of the embodiment 1 of the present invention, FIG. 2 is a bottom view of rotor blade means when seen from I-I line in FIG. 1, FIG. 3 is a sectional view cut on II-II line in FIG. 1, and FIG. 4 is a front sectional view illustrating a flow pattern in a container of the crystallization device in the embodiment 1.

Reference numeral 1 denotes a crystallization device of this embodiment, reference numeral 2 denotes a container of the crystallization device 1, and the container 2 has a vertical cylindrical shape with a bottom and is constituted by binding a lid body 2a to an upper end thereof. A bottom portion 2b of the container 2 is formed having a curved shape, a through hole 2c is formed at a center part of the bottom portion 2b, a classification leg 3 is secured to a lower surface of the bottom portion 2b, and an inside of the classification leg 3 is configured to communicate with an inside of the container 2 through the through hole 2c.

The lid body 1a is formed having a curved shape, on an upper surface of a top part of the center thereof, a driving source 4 is provided and a through hole 2d is formed in the top part, the driving source 4 is composed of a motor 4a and a speed reducer 4b, a rotating shaft 4c as an output of the speed reducer 4b is suspended downward through the through hole 2d, and rotor blade means 5 is fastened to a lower end portion of the rotating shaft 4c. Here, the rotor blade means 5 is located above a raw material liquid A in the container 2.

Figure 2:
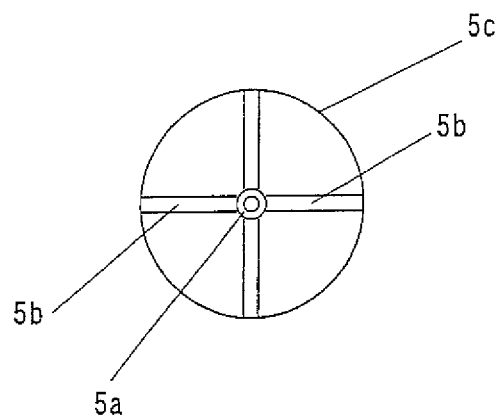
FIG. 2 is a bottom view of rotor blade means when seen from I-I line in FIG. 1.

The rotor blade means 5 is composed of a boss 5a inserted through/secured to the rotating shaft 4c as illustrated in FIG. 2 and blades 5b, each made of a linear band-shaped plate, secured to the boss 5a and extending radially.

Reference numeral 6 denotes liquid-flow direction changing means, and the liquid-flow direction changing means 6 is made of a plurality of or four baffles 6a, for example, each made of a linear band-shaped plate, secured radially to an inner surface of the bottom portion 2b, and each of these baffles 6a is secured at a position in parallel with a radial direction line R passing through the center of the bottom portion 2b at an interval d in the rear in a rotating direction of the rotor blade means 5 as illustrated in FIG. 3, and an inner end of each of the baffles 6a is made to coincide with a periphery of the through hole 2c.

Reference numeral 7 denotes a circulation pipeline, and the circulation pipeline 7 causes a lower end portion of the classification leg 3 and an upper part on a side surface of the container 2 to communicate with and to be connected to each other. Reference numeral 8 denotes an outflow tube of crystals, connected to a side surface of the classification leg 3.

Subsequently, an action and an effect of the crystallization device 1 of this embodiment will be described.

In a state in which a predetermined amount of the raw material liquid A of a suspension slurry is filled in the container 2, that is, the container 2 is filled with the suspension slurry to an upper part in the container 2, the motor 4a is driven so as to rotate the rotor blade means 5 at a peripheral speed of a blade tip at an extremely low speed such as 1.0 m/s or less, for example, and to generate a gentle flow Fa gradually moving downward while swirling along the inner circumferential surface of the container 2 as illustrated in FIG. 4, and when the flow reaches the vicinity of the bottom portion 2b, since each of the baffles 6a has the interval d from the radial direction line R in the rear in the rotating direction of the rotor blade means 5, the raw material liquid having hit the baffle 6a becomes a flow Fb rising while swirling at the center part of the container 2, and the flows Fa and Fb form a gentle circulation flow. That is, without a draft tube in the prior-art crystallization device, the gentle circulation flow of the rising flow Fb at the center part of the container 2 and the downward flow Fa in the peripheral part in the container 2 is generated. In the rising flow Fb generated by the baffle 6a during this circulation, crystals having grown to a desired size go out of the circulation flow and settle to the bottom portion 2b in the container 1, and the crystals classified in the classification leg 3 flow out of the outflow tube 8.

As described above, since it is configured such that the crystals having grown to the desired size when the rising flow is generated by the baffle 6a are caused to settle to the bottom portion 2b, the classification performance is improved.

In this embodiment, a disk 5c is secured to an upper end portion of the blade 5b, and thus, a stirring zone below the disk 5c and a non-stirring zone above the disk zone 5c can be separated by the disk 5c, and a supernatant containing microcrystals in the non-stirring zone flows into the classification leg 3 through the circulation pipeline 7 by an action of gravity.

Figure 5:
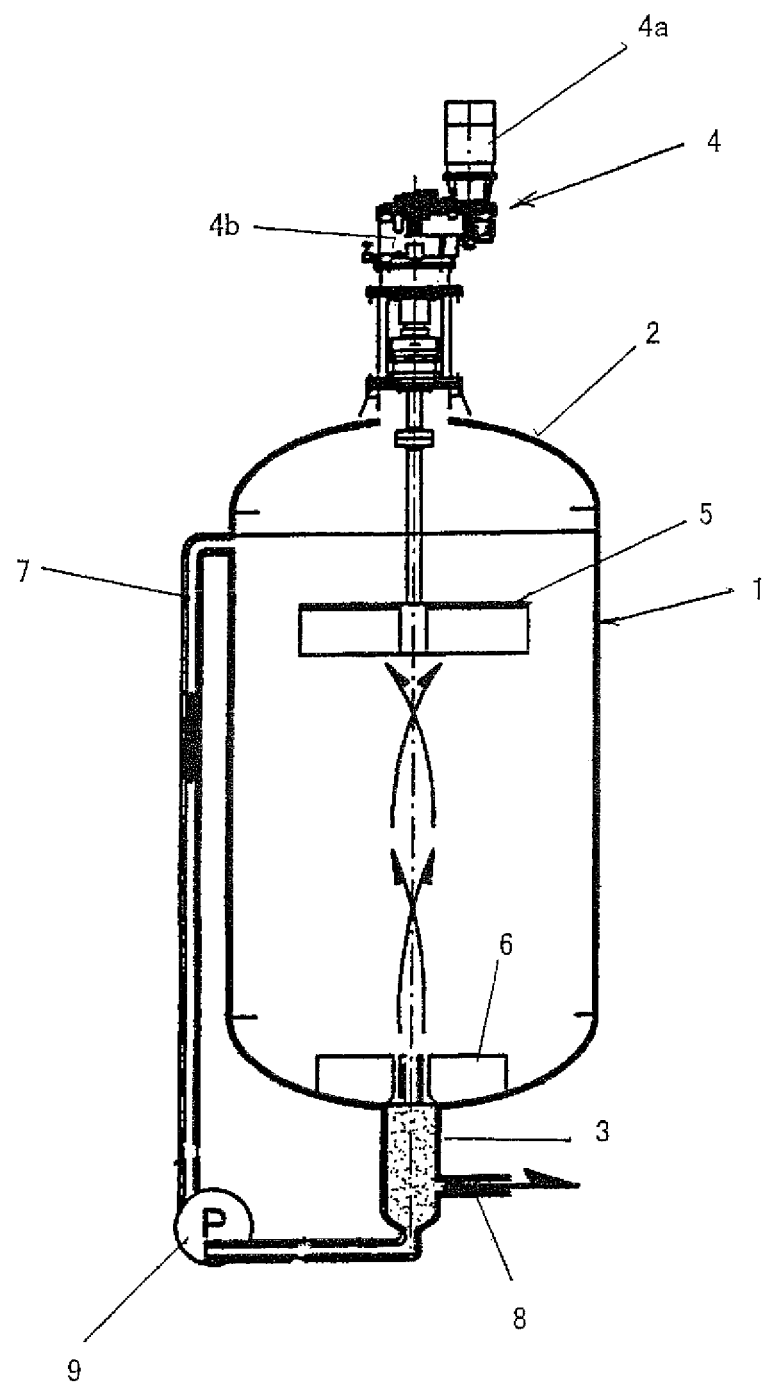
FIG. 5 is a front sectional view of the crystallization device of a variation of the embodiment 1.
Figure 6:
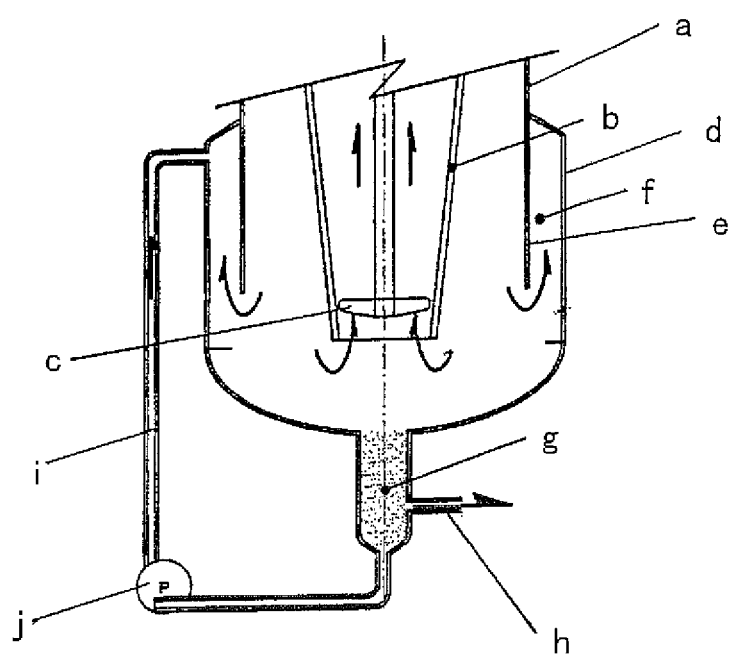
FIG. 6 is a front sectional view of a lower half part of a prior-art crystallization device.

It may be so configured that a pump 9 is interposed in the circulation pipeline 7 as illustrated in FIG. 5, and the supernatant containing the microcrystals in an upper peripheral part in the container 2 is forced to flow into the classification leg 3 through the circulation pipeline 7 by a discharging action of the pump 9.

Moreover, in this embodiment, the blade 5b of the rotor blade means 5 is formed by a linear band-shaped plate, but it may be formed of a curved band-shaped plate.

Furthermore, in this embodiment, the disk 5c is secured to the upper end portion of the blade 5b, but the disk 5c does not have to be secured.

Moreover, in this embodiment, the baffle is formed of a linear band-shaped plate, but the baffle may be formed of a curved band-shaped plate.

[Industrial Applicability]

The crystallization device of the present invention is used for obtaining intermediate products and end products in the fields of pharmaceutical products, food products and the like.

[Reference Signs List]
1 crystallization device
2 container
2a bottom portion
3 classification leg
5 rotor blade means
5a hub
5b blade body
5c disk
6 liquid-flow direction changing means
6a baffle

The invention claimed is:

1. A crystallization device comprising:
   a vertical container;
   a classification leg on a bottom part of the container;
   a rotor blade means provided at a center part of an upper part in the vertical container configured to generate a swirling flow of a raw material liquid in the container along an inner circumferential surface of the container;
   a liquid-flow direction changing means provided at a center part of a bottom surface in the container configured to cause the raw material liquid to flow upward at the center part of the container; and
   a circulation pipeline having a first fluid opening at a lower end portion of the classification leg and a second fluid opening at a side surface of the container above the rotor blade means.

2. The crystallization device according to claim 1, wherein the liquid-flow direction changing means is constituted by baffles provided radially on the bottom surface.

3. The crystallization device according to claim 2, wherein the baffles are formed of band-shaped plates disposed at a predetermined interval from a radial line of the center of the bottom surface in a rear of a rotating direction of the rotor blade means.

4. The crystallization device according to claim 1, wherein the rotor blade means is composed of a blade body protruding radially from a hub and a disk secured to an upper end of the blade body.

5. The crystallization device according to claim 2, wherein the rotor blade means is composed of a blade body protruding radially from a hub and a disk secured to an upper end of the blade body.

6. The crystallization device according to claim 3, wherein the rotor blade means is composed of a blade body protruding radially from a hub and a disk secured to an upper end of the blade body.

7. The crystallization device according to claim 3, wherein each band-shaped plate of each baffle is fixed and includes a flat top surface.

8. The crystallization device according to claim 1, wherein the vertical container does not include a draft tube therethrough.

* * * * *